(12) United States Patent
Fellenstein et al.

(10) Patent No.: US 7,562,118 B2
(45) Date of Patent: Jul. 14, 2009

(54) E-MAIL ROUTE TRACE FUNCTIONALITY

(75) Inventors: Craig Fellenstein, Brookfield, CT (US); Carl Phillip Gusler, Austin, TX (US); Rick Allen Hamilton, II, Charlottesville, VA (US); Harry Schatz, McLean, VA (US)

(73) Assignee: International Business Machines Corporation, Armonk, NY (US)

( * ) Notice: Subject to any disclaimer, the term of this patent is extended or adjusted under 35 U.S.C. 154(b) by 1100 days.

(21) Appl. No.: 10/617,527

(22) Filed: Jul. 10, 2003

(65) Prior Publication Data

US 2005/0010643 A1 Jan. 13, 2005

(51) Int. Cl.
*G06F 15/16* (2006.01)
*G06F 17/30* (2006.01)

(52) U.S. Cl. ............... 709/206; 709/207; 709/236; 709/224; 709/240; 379/93.01; 379/93.24; 379/265.09

(58) Field of Classification Search ............ 709/206, 709/207, 227, 229, 224, 240, 236; 705/400, 705/401
See application file for complete search history.

(56) References Cited

U.S. PATENT DOCUMENTS

| | | | |
|---|---|---|---|
| 5,476,420 A | 12/1995 | Manning | |
| 5,748,884 A | 5/1998 | Royce et al. | |
| 5,790,790 A | 8/1998 | Smith et al. | |
| 5,801,700 A | 9/1998 | Ferguson | |
| 5,850,520 A | 12/1998 | Griebenow et al. | |
| 5,878,230 A | 3/1999 | Weber et al. | |
| 6,138,146 A | 10/2000 | Moon et al. | |
| 6,138,158 A | 10/2000 | Boyle et al. | |
| 6,182,059 B1 | 1/2001 | Angotti et al. | |
| 6,199,106 B1 | 3/2001 | Shaw et al. | |
| 6,223,168 B1 | 4/2001 | McGurl et al. | |
| 6,370,575 B1 | 4/2002 | Dougherty et al. | |
| 6,442,600 B1 | 8/2002 | Anderson | |
| 6,449,635 B1 | 9/2002 | Tilden et al. | |
| 6,477,647 B1 | 11/2002 | Venkatraman et al. | |
| 6,618,747 B1 * | 9/2003 | Flynn et al. | 709/206 |
| 6,721,784 B1 * | 4/2004 | Leonard et al. | 709/206 |

(Continued)

FOREIGN PATENT DOCUMENTS

WO   WO 01/97432 A2   12/2001

(Continued)

OTHER PUBLICATIONS

Gotmarketing, "GotMarketing Announces Viralocity," web page available at http://www.gotmarketing.com/corporate/press-releases/august_21_2002_1.html (Accessed May 1, 2003).

(Continued)

*Primary Examiner*—Jude J Jean Gilles
(74) *Attorney, Agent, or Firm*—Francis Lammes; Stephen J. Walder, Jr.; William H. Steinberg (57) ABSTRACT

An example of a solution provided here comprises: in response to a request from an original sender, transmitting tracing notifications to the original sender, and providing limits for the tracing notifications. The tracing notifications operate when an e-mail message is forwarded to at least one non-original recipient.

10 Claims, 3 Drawing Sheets

U.S. PATENT DOCUMENTS

| | | | |
|---|---|---|---|
| 6,751,670 B1* | 6/2004 | Patterson | 709/229 |
| 6,973,481 B2* | 12/2005 | MacIntosh et al. | 709/206 |
| 6,988,129 B2 | 1/2006 | Quine | |
| 6,999,989 B2 | 2/2006 | DeLaCruz | |
| 7,085,745 B2* | 8/2006 | Klug | 705/401 |
| 2002/0040387 A1* | 4/2002 | Lessa et al. | 709/206 |
| 2002/0099777 A1 | 7/2002 | Gupta et al. | |
| 2002/0104026 A1* | 8/2002 | Barra et al. | 713/202 |
| 2002/0143881 A1 | 10/2002 | DeLaCruz | |
| 2003/0135565 A1 | 7/2003 | Estrada | |
| 2004/0221012 A1 | 11/2004 | Heumesser | |
| 2005/0021650 A1 | 1/2005 | Gusler et al. | |

FOREIGN PATENT DOCUMENTS

| | | | |
|---|---|---|---|
| WO | WO 01/97432 A3 | 12/2001 | |

OTHER PUBLICATIONS

Slavin, Urban Legend Zeitgeist, "Email Forwarding for Fun and Profit Redux," web page available at http://www.urbanlegends.com/ulz/emailtracking.html (Addressed May 1, 2003).

Visualware, "VisualRoute," web page available at http://www.visualware.com/visualroute/index.html (Accessed May 1, 2003).

Fajman, R., "An Extensible Message Format for Message Disposition Notifications," (RFC 2298) The Internet Society, Mar. 1998. van der Eijk, "The ebXML Messaging Service," web site available at http://www.xml.com/lpt/a/ws/2003/03/18/ebxml.html (Accessed May 1, 2003) OASIS, "Message Service Specification Version 2.0," Organization for the Advancement of Structured Information Standards, Apr. 1, 2002.

* cited by examiner

E-MAIL ROUTE TRACE FUNCTIONALITY

CROSS-REFERENCES TO RELATED APPLICATIONS, AND COPYRIGHT NOTICE

The present application is related to a co-pending patent application entitled Method and System for Multiple-Party, Electronic Mail Receipts, filed on even date herewith. This co-pending patent application is assigned to the assignee of the present application, and herein incorporated by reference. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to electronic mail (e-mail), and more particularly to methods and systems for notifying users of the disposition of messages.

BACKGROUND OF THE INVENTION

In many situations, the original sender of an e-mail message would like to know who, besides the original recipient, has read the message. This is true of a person who, in a corporate environment, sends a message that is politically charged, or a business person who sends an e-mail newsletter to customers, to give just two examples. However, conventional e-mail implementations allow an original recipient of a message to forward the message to any number of people, without the knowledge of the original sender of the message. Conventional receipt notifications merely inform the original sender that the original recipient has read the message. Thus there is a need for systems and methods that address this gap in conventional approaches to e-mail.

SUMMARY OF THE INVENTION

An example of a solution to problems mentioned above comprises: in response to a request from an original sender, transmitting tracing notifications to the original sender, and providing limits for the tracing notifications. The tracing notifications operate when an e-mail message is forwarded to at least one non-original recipient.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

The examples that follow involve the use of one or more computers, and may involve the use of one or more communications networks, or the use of various devices capable of handling e-mail, such cell phones or two-way pagers. The present invention is not limited as to the type of computer or other device on which it runs, and not limited as to the type of network used.

The following are definitions of terms used in the description of the present invention and in the claims:

"Application" means any specific use for computer technology, or any software that allows a specific use for computer technology.

"Comparing" means bringing together for the purpose of finding any likeness or difference, including a qualitative or quantitative likeness or difference.

"Component" means any element or part, and may include elements consisting of hardware or software or both.

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Notification" means any notification message that reports the disposition of another message.

This is traditionally called a "Message Disposition Notification" (MDN), "read receipt," "acknowledgment," or "receipt notification." These traditional terms may be used here, even though the details of MDN's described here differ from traditional MDN's.

"Output" or "Outputting" means producing, transmitting, or turning out in some manner, including but not limited to printing on paper, or displaying on a screen, writing to a disk, or using an audio device.

"Selection signal" means any signal from a user who is making a selection, utilizing any input device, including a keyboard, speech—recognition interface, or pointing device such as a track ball, a joy stick, a touch—sensitive tablet or screen, or a mouse.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

"Tag" means any element, label, field, or value that conveys information about a message, or about how to handle a message.

"Tracing notification" means any notification message that reports the disposition of another message after it has been successfully forwarded to a non-original recipient.

Figure 1:
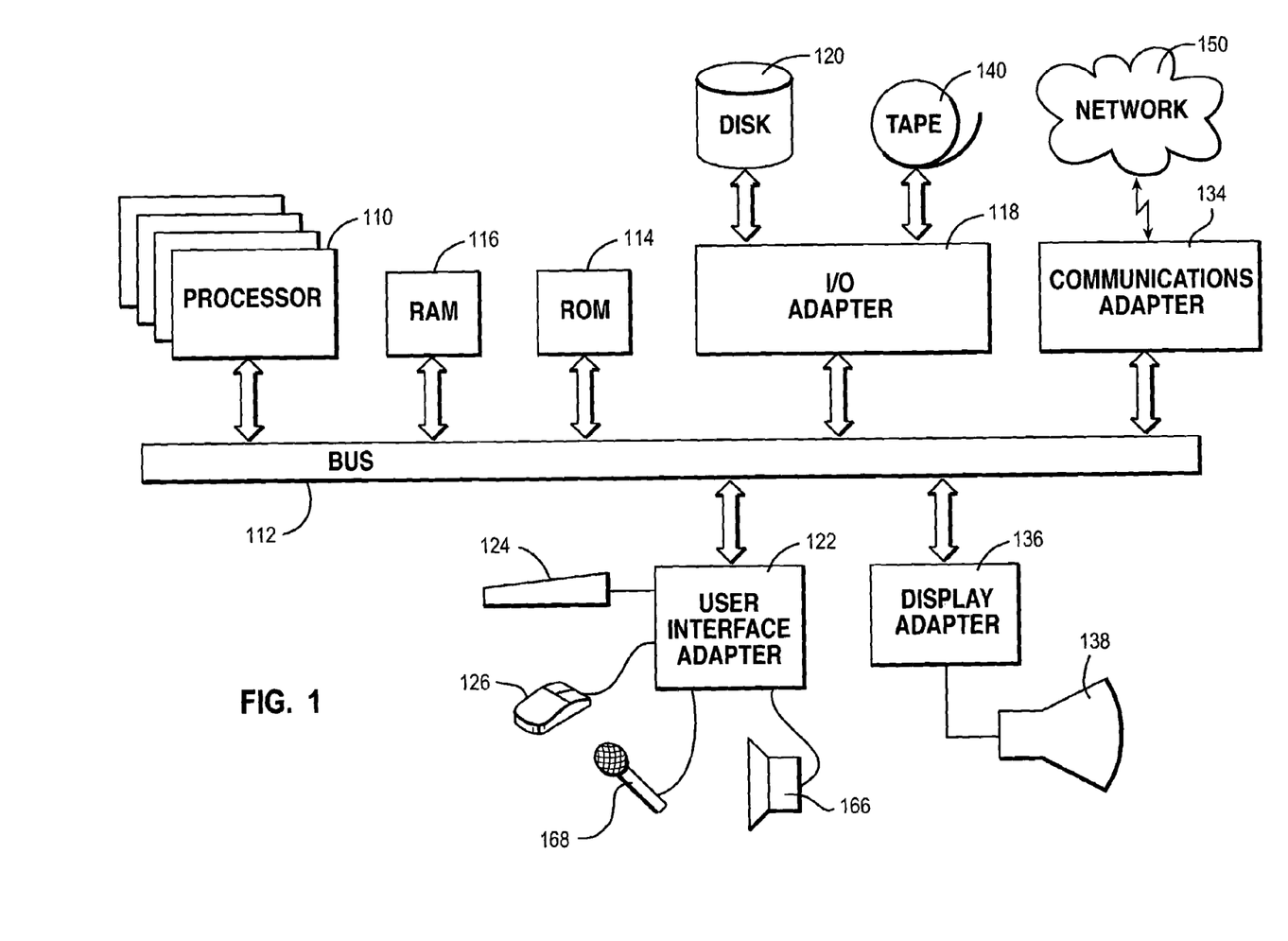
FIG. 1 illustrates a simplified example of a computer system capable of performing the present invention.

FIG. 1 illustrates a simplified example of an information handling system that may be used to practice the present invention. The invention may be implemented on a variety of hardware platforms, including embedded systems, cell phones, two-way pagers, hand-held computers, personal computers, workstations, servers, and mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a communications network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
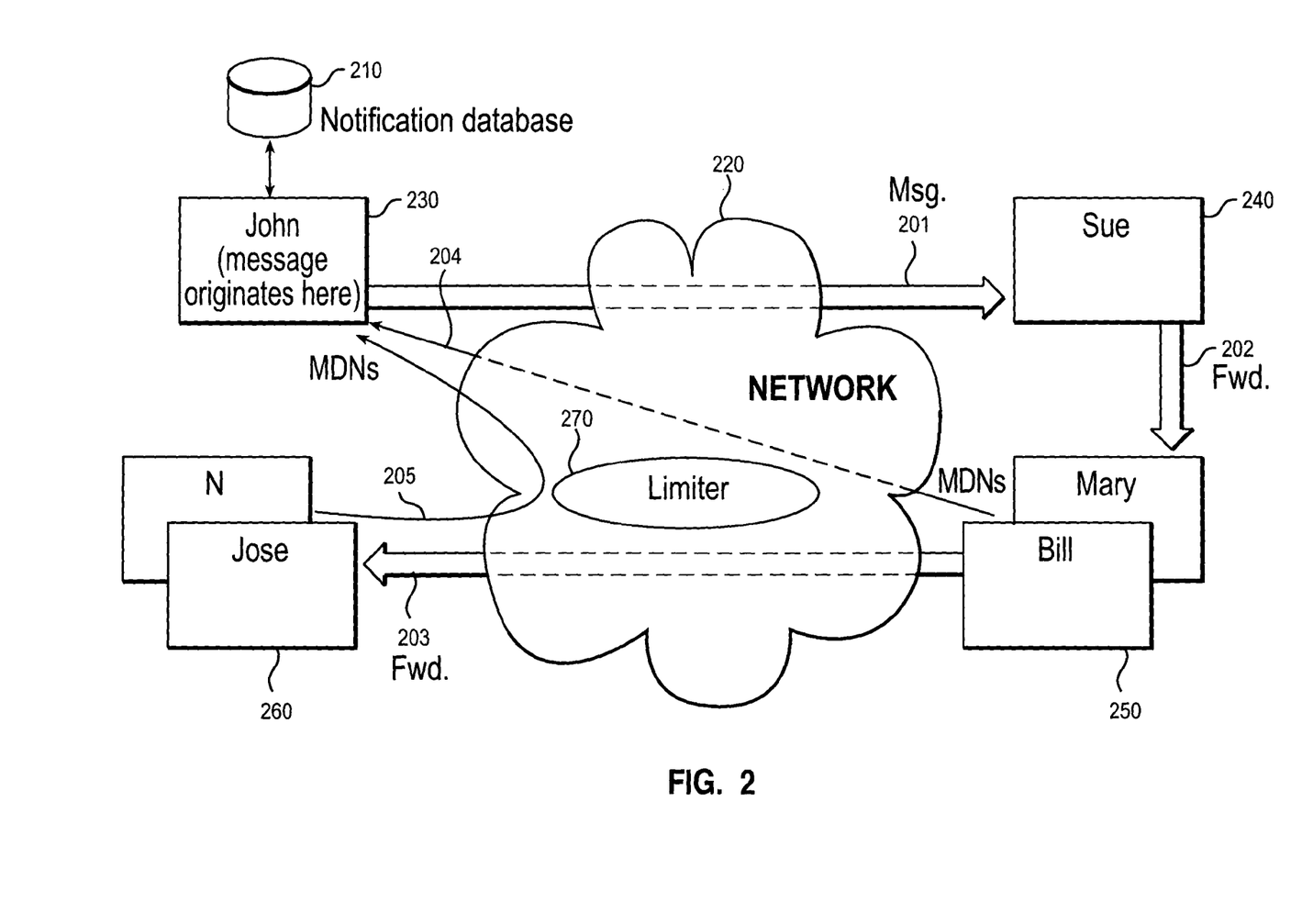
FIG. 2 is a high-level block diagram illustrating an example of a method and system for providing e-mail services according to the teachings of the present invention.

FIG. 2 is a high-level block diagram illustrating an example of a method and system for providing e-mail services according to the teachings of the present invention. A system like this could operate via an intranet, or the Internet, for example, or via some other network (shown at 220). At the upper left, a user named John (not shown) is the original sender of an e-mail message 201. The system allows e-mail communication from a sender, using sender's e-mail client 230, to recipient's e-mail client 240. The sender's e-mail client 230 receives input from the sender, specifying a recipient named Sue at recipient's e-mail client 240, and requesting tracing notifications, for an e-mail message 201. The e-mail message 201 is transmitted to the recipient's e-mail client 240, through network 220. At 202, the e-mail message is forwarded or re-transmitted from Sue's e-mail client 240 to non-original recipients named Mary and Bill, who utilize e-mail clients at 250. In this example, Sue is the original recipient. Later recipients to whom the e-mail message is forwarded are referred to as non-original recipients.

An e-mail notification message that reports the disposition of another message, after it has been successfully delivered to a recipient, is traditionally called a "Message Disposition Notification" (MDN), "read receipt," "acknowledgment," or "receipt notification." These terms are used here, even though the details of MDN's described here differ from traditional MDN's. Receipt notifications or MDN's are transmitted (at 204) from each non-original recipient's e-mail client at 250 to sender's e-mail client 230, through network 220.

To summarize the example so far, FIG. 2 involves the following: in response to a request from an original sender (at 230), transmitting tracing notifications (204) to the original sender; and providing limits (270) for the tracing notifications. The tracing notifications (204) operate when an e-mail message is forwarded (202) to at least one non-original recipient (at 250). Providing limits (270) may involve one or more limiting actions such as: limiting the time during which the tracing notifications operate, limiting the number of retransmissions for which the tracing notifications operate, limiting the tracing notifications' operation, based on a domain policy, limiting the content of the tracing notifications, and discontinuing the tracing notifications, in response to a signal from the original sender.

Continuing with details of the example in FIG. 2, the e-mail message is again forwarded at 203, from e-mail clients at 250 to non-original recipients Jose and any number of others (symbolized by "N," because the others could be numbered from 1 to N), who utilize e-mail clients at 260. MDN's are transmitted (at 205) from each non-original recipient's e-mail client at 260 to sender's e-mail client 230, through network 220. E-mail clients at 230, 240, 250 and 260 may comprise any software and hardware capable of handling e-mail.

Transmitting tracing notifications (204 or 205) may involve signaling that the content of the e-mail message has been provided to at least one non-original recipient (at 250 or 260), or signaling that the e-mail message has been forwarded to (not necessarily opened by) at least one non-original recipient (at 250 or 260).

The example in FIG. 2 involves receiving tracing notifications. Arrows 204 and 205, with heads pointing to original sender's e-mail client 230, symbolize tracing notifications being received by original sender's e-mail client 230. The example involves providing to a user (John, the original sender, at 230) information (based on MDN's 204 and 205) as to who has been provided with the content of the e-mail message 201. This information would identify Mary and Bill, who were provided with the message content via the forwarding at 202. This information also would identify Jose and N, who were provided with the message content via the forwarding at 203. Storing and updating the information may also be involved. This may be accomplished by the original sender saving the MDN's 204 and 205 as they arrive. Storing and updating the information may also be organized and automated to some degree (using notification database 210 for example). Notification database 210 may be a component of sender's e-mail client 230, or notification database 210 may be separate from, but accessible to, sender's e-mail client 230.

Continuing with details of the example in FIG. 2, original sender's e-mail client 230 may serve as means for receiving from the original sender a request for tracing notifications, for e-mail message 201. Original sender's e-mail client 230 may serve as means responsive to the request, for creating at least one tag for e-mail message 201, indicating that the original sender is to receive tracing notifications. The message is tagged and sent at 201. The message is forwarded (at 202 or 203) to a non-original recipient's e-mail client (at 250 or 260), which may serve as means responsive to the tag, for transmitting the tracing notifications (MDN's 204 and 205) to the original sender. Jose's e-mail client (at 260) may serve as means for signaling (at 205) that the content of the e-mail message has been provided to non-original recipient Jose. Mary's e-mail client (at 250) may serve as means for signaling (at 204) that the e-mail message has been forwarded (at 203) to non-original recipient Jose (at 260).

The example in FIG. 2 involves means for providing limits for tracing notifications. An original sender's e-mail client 230 and a non-original recipient's e-mail client (at 250 or 260) may serve as means for providing limits. For example, consider means for limiting the time during which tracing notifications (MDN's) operate. An original sender's e-mail client 230 sets an expiration date. Then a non-original recipient's e-mail client (at 250 or 260) enforces the expiration date, by following a rule such as "do not send the MDN if the expiration date has passed."

As another example, consider means for limiting the number of retransmissions for which tracing notifications operate (i.e. a hop limit). An original sender's e-mail client 230 sets a maximum number of retransmissions. The actual number of retransmissions is stored, and incremented each time the message is forwarded (at 202 or 203). Then a non-original recipient's e-mail client (at 250 or 260) enforces the limit, by following a rule such as "do not send the MDN unless the actual number of retransmissions is less than or equal to maximum number of retransmissions."

As another example, consider means for limiting the content of the tracing notifications. A non-original recipient's e-mail client (at 250 or 260) may provide some privacy protection for a non-original recipient by including in a tracing notification only the person's name, and not the e-mail address of non-original recipient's e-mail client (at 250 or 260).

In FIG. 2, limiter 270 symbolizes a centralized way to implement limits. Arrows passing through network 220 symbolize messages passing through various network components. MDN's 204 and 205, passing near limiter 270, symbolize that one or more components such as an e-mail routing system or a mail server follow rules to impose limits. For example, consider means for limiting the time during which tracing notifications (MDN's) operate. A mail server enforces a policy of not tracing old messages, by following a rule such as "do not send the MDN if the original message is dated over one year before today's date."

As another example, consider means responsive to a signal from the original sender, for discontinuing tracing notifications (i.e. turning off tracing). A mail server stops tracing, by following a rule such as "do not send the MDN if a 'discontinue tracing' signal has been received for this message." As another example, consider limiting the transmitting of tracing notifications, based on a domain policy. An e-mail routing system refuses to send MDN's in some cases, based on the domain of original sender's e-mail client 230, by following a rule such as "do not send the MDN if the message originates in domain X," or "do not send the MDN if the message originates outside of this corporate intranet."

Figure 3:
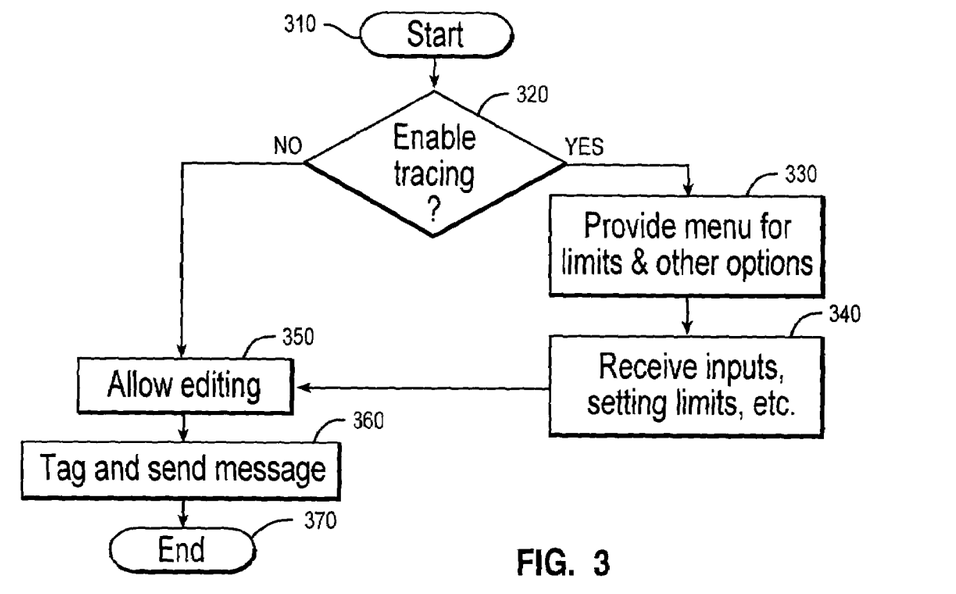
FIG. 3 is a flow chart illustrating an example of a method for sending electronic mail, according to the teachings of the present invention.

FIG. 3 is a flow chart illustrating an example of a method for sending electronic mail, according to the teachings of the present invention. The process starts at 310, which may represent a user (sender) launching an e-mail application in preparation for sending electronic mail to one or more recipients. At decision 320, the "No" branch may be taken, for example if the sender decides to send the message without requesting any tracing notifications. In that case, the sender would proceed directly to writing and editing the message (350) and sending the message with conventional tags (360).

On the other hand, if any tracing notifications are desired, the "Yes" branch may be taken at decision 320, symbolizing receiving from an original sender a request for tracing notifications, for an e-mail message. Then the next step in this example is providing a menu, 330. This is a way of receiving input from the sender, specifying limits for tracing notifications, and other options for the e-mail message. A number of features may be present here. One possibility is providing predefined limits. Another possibility is automatically providing default behavior, in the absence of contrary input from the sender.

The input is received from the sender at 340, to set limits. For example, the sender may, via a selection signal, specify one or more limiting actions such as:

(1) limiting the time during which the tracing notifications operate,
(2) limiting the number of retransmissions for which the tracing notifications operate,
(3) discontinuing the tracing notifications, in response to a signal from the original sender.

Next, writing and editing the message is allowed, 350. Then the message is tagged and sent at 360. This involves creating at least one tag for the e-mail message, indicating that the original sender is to receive the tracing notifications. Creating a tag is in response to the original sender's request at 320 for tracing notifications. For example, an e-mail application may use Transmission Control Protocol (TCP) and deliver a separate copy of the message to each recipient's mailbox. The proper tag is applied to each copy. With the sending accomplished, the process ends at 370 in this example. See also FIG. 2 concerning the receiving of tracing notifications, and FIG. 4 concerning output based on receiving tracing notifications.

Regarding FIG. 3, the order of the operations in the processes described above may be varied. For example, it is within the practice of the invention for a user to follow the path from block 310 to block 340, and choose an option to turn off tracing for a message sent earlier. Then, proceeding directly to block 360, a "discontinue tracing" message may be sent to a mail server. Those skilled in the art will recognize that blocks in FIG. 3 could be arranged in a somewhat different order, but still describe the invention. Blocks could be added to the above-mentioned diagram to describe details, or optional features; some blocks could be subtracted to show a simplified example.

Turning now to details that may be involved in FIG. 3, consider the operation where the message is tagged and sent at block 360. An implementation of tracing notifications may use tags to convey information about how to handle a message. Some predefined, general-purpose tags for e-mail messages are well-known, but the tags described here are new, and they convey information about new kinds of message handling. Various implementation methods may be used for the present invention. Two implementation factors may be considered. One factor is incorporation of metadata into the message, including the e-mail address of the original sender. For example, consider a hypothetical field named "MailOriginator," upon which special actions may be taken. This might be added to a message, and would identify the original sender of a message. A second factor is the reading of such metadata by an e-mail application.

The present invention may use any tags that are understood by both the sender's software and the recipient's software. A unique implementation scheme could be used for an organization's internal e-mail system, for example. On the other hand, the present invention may be implemented by building upon well-known standards for e-mail.

Some examples of standards are: Simple Mail Transfer Protocol (SMTP), Multipurpose Internet Mail Extensions (MIME), and Secure Multipurpose Internet Mail Extensions (S/MIME). Regarding such standards, reference is made to the following documents: Jonathan B. Postel, Request for Comments (RFC) # 821, *Simple Mail Transfer Protocol*, 1982; David H. Crocker, RFC # 822, *Standard for the Format of ARPA Internet Text Messages*, 1982; J. Palme, RFC # 2076, *Common Internet Message Headers*, 1997; and R. Fajman, RFC # 2298, *An Extensible Message Format for Message Disposition Notifications*, 1998. An Internet e-mail message consists of two parts: a header and a body. A header may be used to implement the present invention. A header has a collection of field—value pairs that convey information about the message. For example, a hypothetical field named "MailOriginator" might have a value of "john@acmecorp.com" to identify the original sender of a message.

One example given in RFC # 2298 is the field "Disposition-Notification-To," with a value of at least one mailbox. However, "confirmation from the user SHOULD be obtained (or no MDN sent) . . . if there is more than one distinct address in the Disposition-Notification-To header," according to RFC # 2298. A Disposition-Notification-To header in a message is merely a request for a Message Disposition Notification (MDN).

Extension fields provide a way to implement tracing notifications by building upon the standard described in RFC # 2298. Extension-field names beginning with "X-" are not defined as standard fields; such names are reserved for experimental use, according to RFC # 2298. The name of the application should follow the "X-."

For example, consider an extension field named "X-Tracemail-Tracing-Notification-To," with a value of at least one mailbox (the original sender's e-mail address). This example is for an e-mail application named "Tracemail" that would implement tracing notifications. This extension field would have a persistent quality, serving as a continuous request for MDN's, any time the message is forwarded. This example assumes that this tag is applied to a message by the original sender's software (at block 360 of FIG. 3), and understood by the non-original recipient's software. Then the non-original recipient's software sends an MDN to the original sender's e-mail address, and leaves this extension field intact for later use, when the message is forwarded again.

Continuing with details that may be involved in FIG. 3, extensible markup language (XML), provides a way of containing and managing information that is designed to handle data exchange among various data systems. Thus it is well-suited to implementation of the present invention. Reference is made to the book by Elliotte Rusty Harold and W. Scott Means, *XML in a Nutshell* (O'Reilly & Associates, 2001). As a general rule, XML messages use "attributes" to contain information about data, and "elements" to contain the actual data.

Tracing notifications may be implemented by building upon an XML-based standard such as e-business XML (ebXML), and in particular the ebXML Messaging Service. Reference is made to an article by Pim van der Eijk, *The ebXML Messaging Service*, (O'Reilly & Associates, 2003), available at O'Reilly's XML.com web site. The ebXML Messaging Service specification extends the Simple Object Access Protocol (SOAP) specification to provide security and reliability features. The ebXML Messaging Service specification may be used to transfer messages over SMTP, Hypertext Transfer Protocol (HTTP), or some other communications protocol. There are no restrictions on the message content. Users have a choice of ebXML Messaging Service implementations, provided by different vendors, including open source implementations.

Regarding receipt notifications, ebXML Messaging Service defines an optional <eb:AckRequested> extension element for the <SOAP:Header>. The responding message handler can send a message containing an <eb:Acknowledgment> extension element, with an <eb:RefToMessageId> element to specify which message is being acknowledged.

Reference is made to the specification by the Organization for the Advancement of Structured Information Standards (OASIS) Technical Committee, *ebXML Messaging Services Specification* 2.0 (OASIS 2002). Multi-hop reliable messaging is accomplished using the AckRequested element, and an Acknowledgment Message containing an Acknowledgment element, each with a SOAP actor of Next MSH.

The ebXML Messaging Service specification gives the following example of the AckRequested element targeted at the next message handler (NextMSH). In the following example, an Acknowledgment Message is requested of the next message handler:
<eb:AckRequested SOAP:mustUnderstand="1" eb:version="2.0" eb:signed="false" SOAP:actor="urn:oasis:names:tc:ebxml-msg:actor:nextMSH"/>

The ebXML Messaging Service specification gives the following rule: "If an AckRequested element is present, then generate an Acknowledgment Message in response (this may be as part of another message)."

The ebXML Messaging Service specification gives the following example of an Acknowledgment Message with the Acknowledgment element targeted at the next message handler node along the reverse message path (the Sending MSH):
<eb:Acknowledgment SOAP:mustUnderstand="1" eb:version="2.0"SOAP:actor="urn:oasis:names:tc:ebxml-msg:actor:nextMSH">
<eb:Timestamp>2001-03-09T12:22:30</eb:Timestamp>
<eb:RefToMessageId>323210:e52151ec74:-7ffc@xtacy</eb:RefToMessageId>
<eb:From><eb:PartyId>uri:www.example.com</eb:PartyId></eb:From>
</eb:Acknowledgment>

Tracing notifications may be implemented by building upon the ebXML Messaging Service as follows. For example, consider a new extension element named "TracingAckRequested." This example assumes that this tag is applied to a message by the original sender's software (at block 360 of FIG. 3), and understood by the non-original recipient's software. New behavior for tracing notifications could be specified, so that an e-mail application follows a rule such as: "If a TracingAckRequested element is present, then generate an Acknowledgment Message in response, and send it directly (not along the reverse message path) to the original sender identified in the From element." The TracingAckRequested element is targeted at any non-original recipient (analogous to the NextMSH). The TracingAckRequested element needs to continue to appear on the SOAP message destined to the next message handler, so the TracingAckRequested element needs to be reapplied by each message handler.

Figure 4:
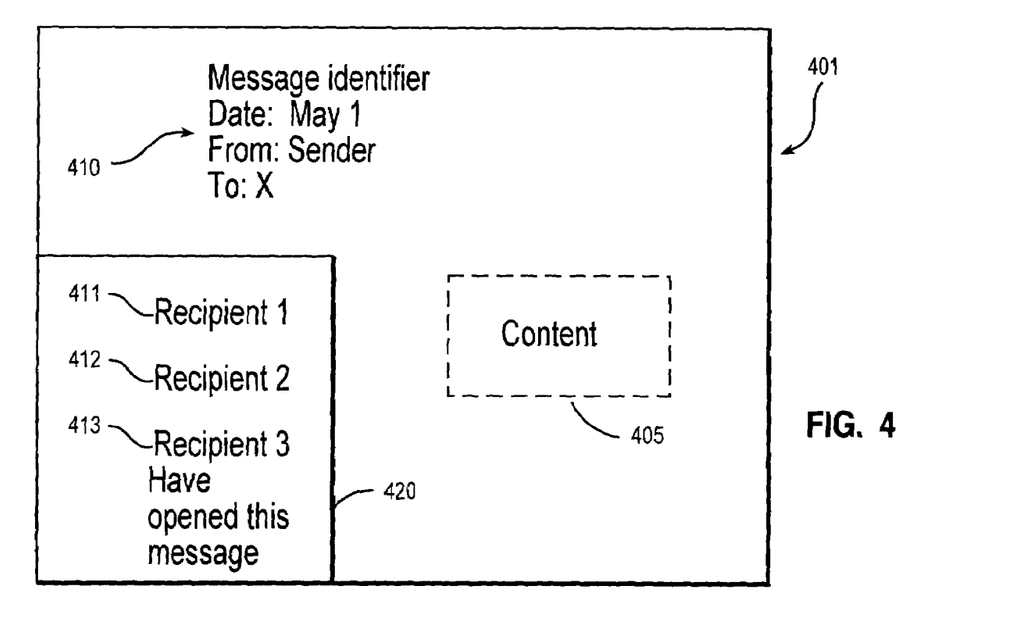
FIG. 4 is a diagram illustrating an example of output for a user, according to the teachings of the present invention.

FIG. 4 is a diagram illustrating an example of output for a user, according to the teachings of the present invention. To begin with an overview, FIG. 4 shows a user interface 401 for an original sender. The example in FIG. 4 involves output, based on receiving tracing notifications that operate when the e-mail message is forwarded to at least one non-original recipient. FIG. 4 shows an example of providing to a user a representation (at 410 or 405 or both) of the e-mail message, together with information (at 420) as to who has perceived the content of the e-mail message, or who has been provided with the content of an e-mail message. A user interface like this could be used with a method and system like the one shown in FIGS. 2-3. A user interface like this could be displayed with text and graphics, as shown at 401. An audible interface also could be provided to the sender via audio output.

Turning to details of FIG. 4, interface 401 provides output, based on receiving tracing notifications that operate when the e-mail message is forwarded to at least one non-original recipient. At the top of interface 401 is a representation of a message, at 410, including a message identifier such as a "subject" description, or an identification number. Also included in the representation of the message at 410 are the date of the message and the names of sender and recipient. In another format, an interface like 401 may provide representations of a number of messages. A user may pick a message of interest from a list, for example.

In interface 401 there is a section 420 showing who has opened this message. In this example, three recipients listed at 411, 412, and 413 have opened this message. An optional feature is providing or displaying at least some of the content of a message at 405, as a representation of a message. The content, visible or accessible at 405, may include text, graphics, audio content or video content. In other words, FIG. 4 shows an example of means for providing to a user a representation (at 410 or 405 or both) of the e-mail message, together with information (at 420) as to who has been provided with the content of the e-mail message.

Information provided in section 420, showing who has opened this message, may change from time to time. This would involve storing and updating the information, as discussed above in connection with notification database 210 in FIG. 2. Section 420 may serve as means for signaling that the content of the e-mail message has been provided to at least one non-original recipient. Section 420 may serve as means for signaling that the e-mail message has been forwarded to (not necessarily opened by) at least one non-original recipient. Section 420 may provide output based on one or more kinds of tracing notifications such as:

(1) notifications reporting that the message has been sent somewhere in some manner (e.g. forwarded or faxed),
(2) notifications reporting that the message contents were provided to someone reading a non-original recipient's mailbox,
(3) notifications reporting deletion (perhaps without display) of the message.

With an interface like 401, spoken input could be received from the sender via a speech recognition interface, or the sender might mark a word displayed on a screen. A user's input might specify a particular message that the user is interested in, or specify a particular behavior for the interface 401, for example.

In conclusion, we have shown examples of solutions that deliver information as to who has been provided with the content of an e-mail message.

One of the possible implementations of the invention is an application, namely a set of instructions (program code) executed by a processor of a computer from a computer-usable medium such as a memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the method.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A method for providing electronic mail (e-mail) services, said method comprising:
    receiving from an original sender a request for tracing notifications, for an e-mail message;
    in response to said request, creating at least one tag for said e-mail message, indicating that said original sender is to receive said tracing notifications;
    receiving at a computing device of the original sender said tracing notifications from one or more non-original recipients in response to said e-mail message being forwarded by an original recipient to at least one non-original recipient; and
    providing limits for said tracing notifications, wherein said providing limits further comprises:
        limiting a number of retransmissions for which said tracing notifications operate, wherein limiting the number of retransmissions for which tracing notifications operate further comprises:
            setting a maximum number of retransmissions for the email message,
            incrementing an actual number of retransmissions of the email message each time the email message is forwarded from the original recipient to the one or more non-original recipients,
            responsive to the actual number of retransmissions being less than or equal to the maximum number of retransmissions, transmitting the email message from the original recipient to the one or more non-original recipients, and
            responsive to the actual number of retransmissions being more than the maximum number of retransmissions, refusing to transmit the email message from the original recipient to the one or more non-original recipients, and
        limiting the content of said tracing notifications, wherein limiting the content of the tracing notifications transmitted to the original sender limits the content of the tracing notifications to only a name of the non-original recipient while excluding an e-mail address of the non-original recipient.

2. The method of claim 1, further comprising:
providing to a user
a representation of said e-mail message,
together with information as to who has been provided with the content of said e-mail message.

3. The method of claim 2, further comprising:
storing and updating said information.

4. The method of claim 1, further comprising:
transmitting said tracing notifications to said original sender, from said at least one non-original recipient.

5. The method of claim 4, wherein said transmitting tracing notifications further comprises transmitting one or more tracing notifications selected from a group consisting of:
    notifications reporting that said message has been sent somewhere in some manner,
    notifications reporting that the content of said message was provided to said at least one non-original recipient,
    and notifications reporting deletion of said message.

6. A method for providing e-mail services, said method comprising:
    in response to a request from an original sender, transmitting tracing notifications to a computing device of said original sender from one or more non-original recipients in response to an e-mail message being forwarded by an original recipient to at least one non-original recipient; and providing limits for said tracing notifications, wherein said providing limits further comprises:
 limiting a number of retransmissions for which said tracing notifications operate, wherein limiting the number of retransmissions for which tracing notifications operate further comprises:
  setting a maximum number of retransmissions for the email message,
  incrementing an actual number of retransmissions of the email message each time the email message is forwarded from the original recipient to the one or more non-original recipients,
  responsive to the actual number of retransmissions being less than or equal to the maximum number of retransmissions, transmitting the email message from the original recipient to the one or more non-original recipients, and
  responsive to the actual number of retransmissions being more than the maximum number of retransmissions, refusing to transmit the email message from the original recipient to the one or more non-original recipients, and
 limiting the content of said tracing notifications, wherein limiting the content of the tracing notifications transmitted to the original sender limits the content of the tracing notifications to only a name of the non-original recipient while excluding an e-mail address of the non-original recipient.

7. The method of claim 6, wherein said transmitting tracing notifications further comprises:
 signaling that the content of said e-mail message has been provided to said at least one non-original recipient.

8. The method of claim 6, wherein said transmitting tracing notifications further comprises:
 signaling that said e-mail message has been forwarded to said at least one non-original recipient.

9. The method of claim 6, further comprising:
 providing to a user
 a representation of said e-mail message,
 together with information as to who has been provided with the content of said e-mail message.

10. The method of claim 9, further comprising:
 storing and updating said information.

* * * * *